(12) United States Patent
Flick

(10) Patent No.: US 6,587,052 B1
(45) Date of Patent: Jul. 1, 2003

(54) VEHICLE REMOTE CONTROL AND VOICE MESSAGE RECORDING DEVICE WITH REMOTE CONTROL SYSTEM AND RELATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 0 days.

(21) Appl. No.: 09/366,848

(22) Filed: Aug. 4, 1999

(51) Int. Cl.[7] ............... G08C 19/00; G05B 19/00
(52) U.S. Cl. ............... 340/825.69; 340/825.62; 340/825.57; 340/5.22
(58) Field of Search ............ 340/825.69, 5.22, 340/825.62, 825.57

(56) References Cited

U.S. PATENT DOCUMENTS

| | | | |
|---|---|---|---|
| 4,197,497 A | 4/1980 | Phelps | 455/18 |
| 4,356,519 A | 10/1982 | Cogdell, Jr. | 360/61 |
| 4,360,808 A | 11/1982 | Smith, III et al. | 340/825.69 |
| 4,677,657 A | 6/1987 | Nagata et al. | 379/63 |
| 4,839,749 A | 6/1989 | Franklin | 360/12 |
| 4,873,520 A | 10/1989 | Fisch et al. | 340/825.44 |
| 4,904,983 A | 2/1990 | Mitchell | 340/426 |
| 4,940,964 A | 7/1990 | Dao | 340/438 |
| 5,193,215 A | 3/1993 | Olmer | 455/66 |
| 5,245,694 A | 9/1993 | Zwern | 395/2 |
| 5,495,357 A | 2/1996 | Osterhout | 359/152 |
| 5,500,636 A | 3/1996 | Mitchell | 340/328 |
| 5,889,472 A * | 3/1999 | Nagel et al. | 340/426 |
| 5,903,871 A * | 5/1999 | Terui et al. | 704/270 |
| 5,940,007 A * | 8/1999 | Brinkmeyer et al. | 307/10.7 |

* cited by examiner

Primary Examiner—Brian Zimmerman
Assistant Examiner—Clara Yang
(74) Attorney, Agent, or Firm—Allen, Dyer, Doppelt, Milbrath & Gilchrist, P.A.

(57) ABSTRACT

A vehicle remote control and voice message recording system includes a vehicle remote function controller and associated receiver in the vehicle, and a vehicle remote control and voice message recording device to be carried by a user. The vehicle remote control and voice message recording device includes a housing, a transmitter for transmitting signals to the receiver to operate the vehicle remote function controller responsive to user activation of at least one switch carried by the housing, and a record and playback circuit. The record and playback circuit is for recording and playing back a voice message from the user. For example, the user can use the record and playback circuit to record a parking location of the vehicle. Since the user would carry the remote control device with him, the device can be later used when returning to the parking facility to locate the parked vehicle.

32 Claims, 4 Drawing Sheets

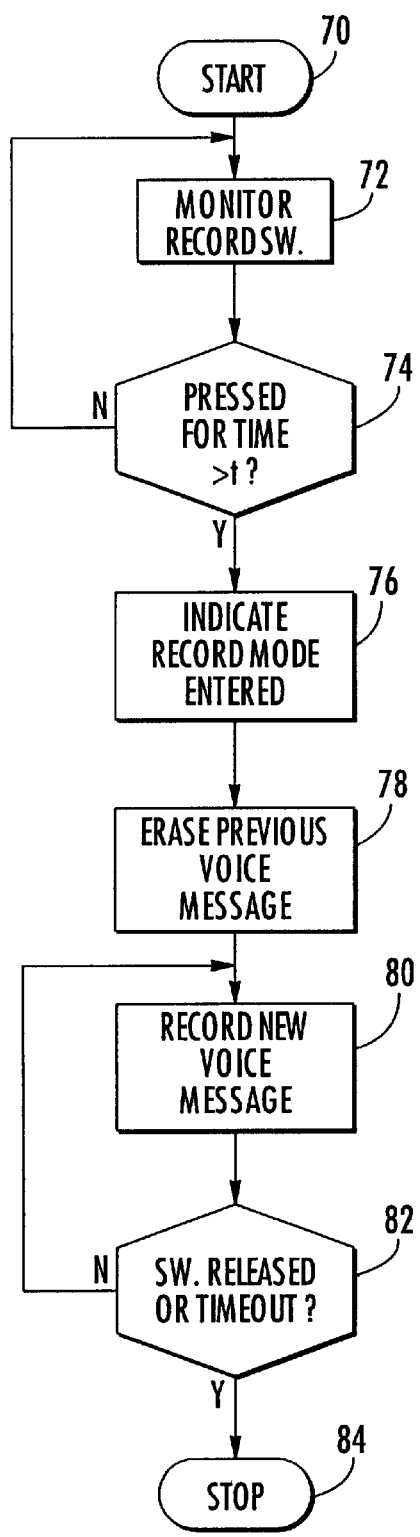
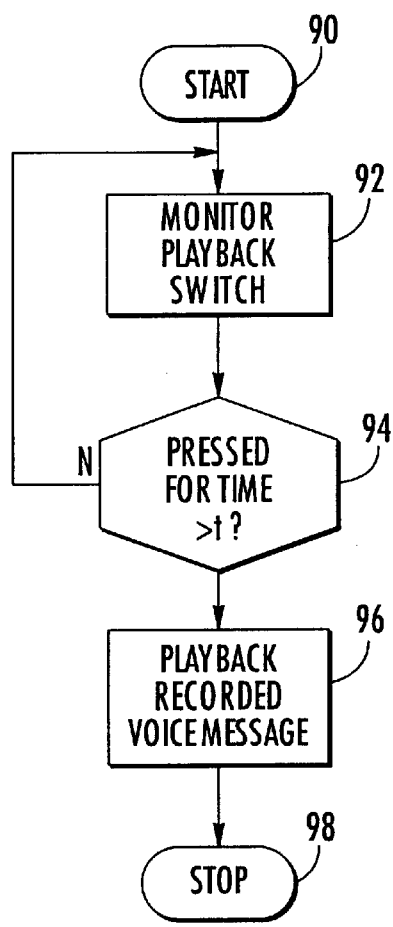
FIGURE 4
FIGURE 3

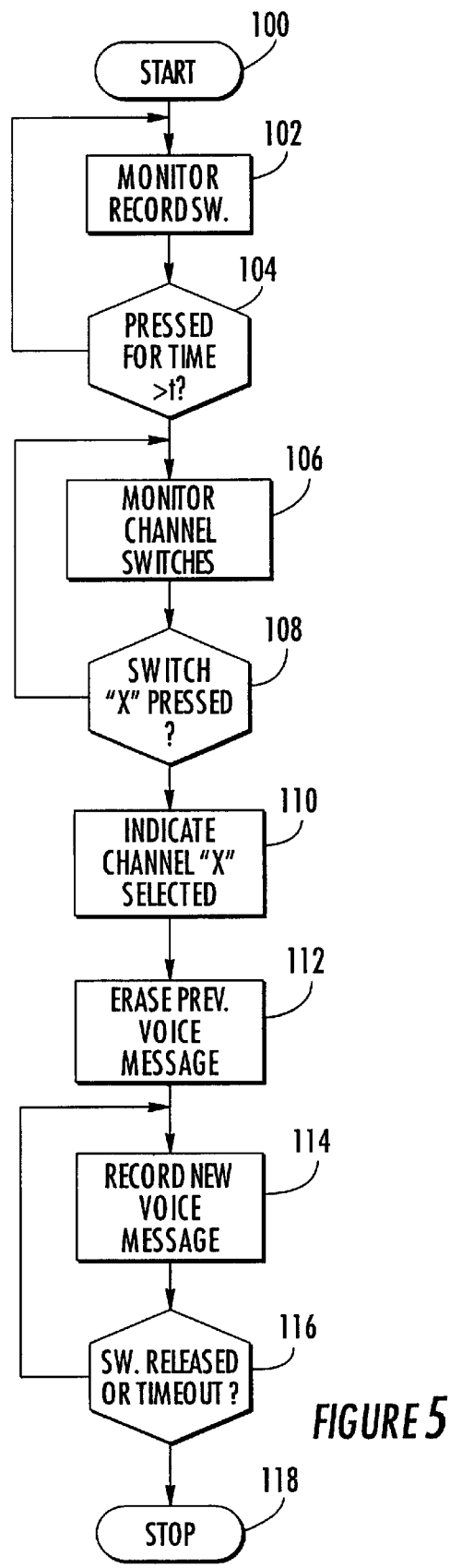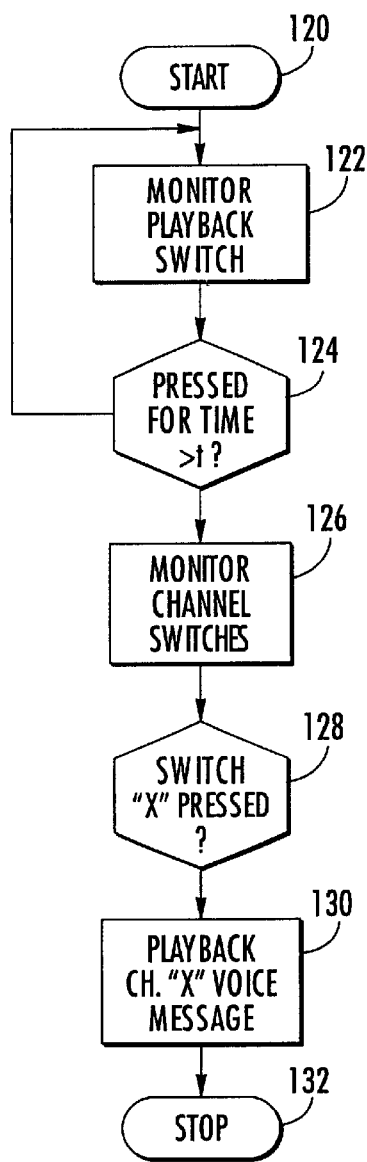
FIGURE 5
FIGURE 6

VEHICLE REMOTE CONTROL AND VOICE MESSAGE RECORDING DEVICE WITH REMOTE CONTROL SYSTEM AND RELATED METHODS

FIELD OF THE INVENTION

The present invention relates to the field of vehicle remote control systems, such as vehicle security systems. More particularly, the invention relates to a remote control and voice message recording device to be used in combination with such vehicle remote control systems.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

A significant advance in the area of vehicle security systems in disclosed in U.S. Pat. No. 5,654,688. The patent discloses a features whereby the number of remote transmitters coded to operate the alarm controller may be displayed to the user. Accordingly, the user is notified when an unauthorized remote transmitter has been learned into the system, which is relatively easy to do unfortunately. Yet another advance is disclosed in U.S. Pat. No. 5,719,551. This patent discloses a vehicle security system wherein the alarm controller includes an enabling feature to operate with any of a number of different vehicles including a data communications bus.

Despite continuing improvements in the area of vehicle remote control systems, such as security systems, these systems are still lacking in certain convenience features. One problem that may be particularly vexing to a vehicle user is where the vehicle is parked at a large facility, such as an airport parking lot or entertainment venue. While a user may try to activate the arm and disarm feature of a security system to home in on the lost vehicle, this approach does not typically succeed in practice.

SUMMARY OF THE INVENTION

In view of the foregoing background, it is therefore an object of the present invention to provide an enhancement to a vehicle remote control system to make it more convenient, in particular, for providing reminders to the user, such as the parking location of the vehicle.

This and other objects, features and advantages in accordance with the present invention are provided, in one embodiment, by a vehicle remote control and voice message recording system comprising a vehicle remote function controller and associated receiver in the vehicle, and a vehicle remote control and voice message recording device to be carried by a user. The vehicle remote control and voice message recording device preferably comprises a housing, at least one switch carried by the housing, a transmitter for transmitting signals to the receiver to operate the vehicle remote function controller responsive to user activation of the at least one switch, and a record and playback circuit in the housing.

The record and playback circuit is for recording and playing back a voice message from the user. For example, the user can use the record and playback circuit to record the parking location of the vehicle. Since the user would carry the remote control device with him, the device can be later used when returning to the parking facility to locate the parked vehicle. Of course, the record and playback feature can be advantageously used for other voice messages and reminders as well.

The record and playback circuit may comprise a storage circuit for at least one voice message. In one variation, the storage circuit may store a plurality of individual voice messages. Accordingly, the device may further comprise a selector, such as one or more of the switches on the housing, for selectively playing back a desired voice message from among the plurality of stored individual voice messages. In another more simplified variation, the record and playback circuit includes a circuit cooperating with the storage circuit for recording a new voice message in place of a prior voice message. In other words, only a single message is recorded and a new message is recorded over the prior message. Accordingly, this variation can be made relatively inexpensive and is easy to operate.

The storage circuit for the voice message may be provided by a semiconductor memory, such as, for example, an electrically erasable and programmable memory. The record and playback circuit may further include an analog-to-digital converter for converting the voice message signal into digital message data stored in the semiconductor memory during recording. Of course, in this embodiment, the record and playback circuit may also preferably further comprise a digital-to-analog converter for converting the digital data from the semiconductor memory back into a voice message signal during playback.

The record and playback circuit may include a transducer carried by the housing for performing at least one of a speaker and microphone function. A single transducer may be used for both functions, or two transducers could be provided.

The vehicle remote function controller may be a vehicle remote keyless entry controller. Accordingly, at least one door lock motor may be connected to the vehicle remote keyless entry controller. In another embodiment, the vehicle remote function controller may be a vehicle security system controller, and at least one vehicle security sensor may be connected to this controller. The vehicle remote function controller may alternately be a vehicle remote start controller connected to a starter activating circuit.

The vehicle remote control and voice message recording device may further comprise a battery carried by the housing to provide the necessary electrical power. A receiver may also be provided in the housing for receiving signals, such as alert signals, from the vehicle controller. For convenience in a typical configuration, the housing for the device may include an opening formed therein to receive a key ring for a vehicle ignition key.

A method aspect in accordance with the invention is for operating a remote vehicle control and message recording device to be carried by a user in combination with a receiver and associated vehicle remote function controller in the vehicle. The method preferably comprises the steps of: transmitting signals from the remote vehicle control and message recording device to the receiver to operate the vehicle remote function controller; recording at least one voice message from the user in the remote vehicle control and message recording device; and playing back the at least one recorded voice message from the remote vehicle control and message recording device.

BRIEF DESCRIPTION OF THE DRAWINGS

FIG. 3 is a flowchart for recording a new voice message in accordance with a first embodiment of the invention having only a single recorded voice message.

FIG. 4 is a flowchart for playing back the single recorded voice message in accordance with the invention.

FIG. 5 is a flowchart for recording a new voice message in accordance with a second embodiment of the invention having a plurality of recorded voice messages.

FIG. 6 is a flowchart for playing back a desired one of a plurality of recorded voice messages in accordance with the invention.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

Figure 1:
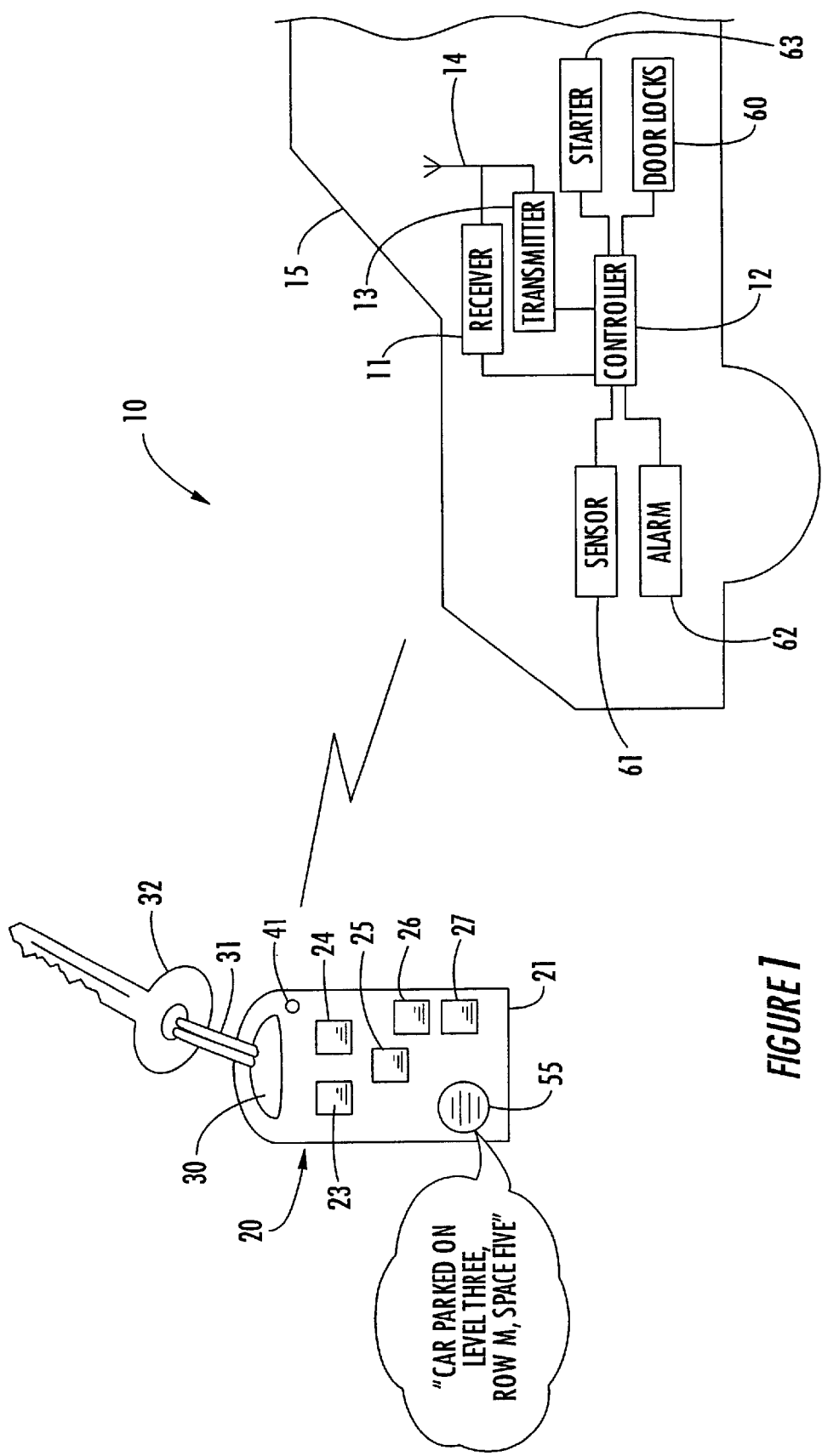
FIG. 1 is a schematic block diagram of the vehicle remote control system in accordance with the present invention.
Figure 2:
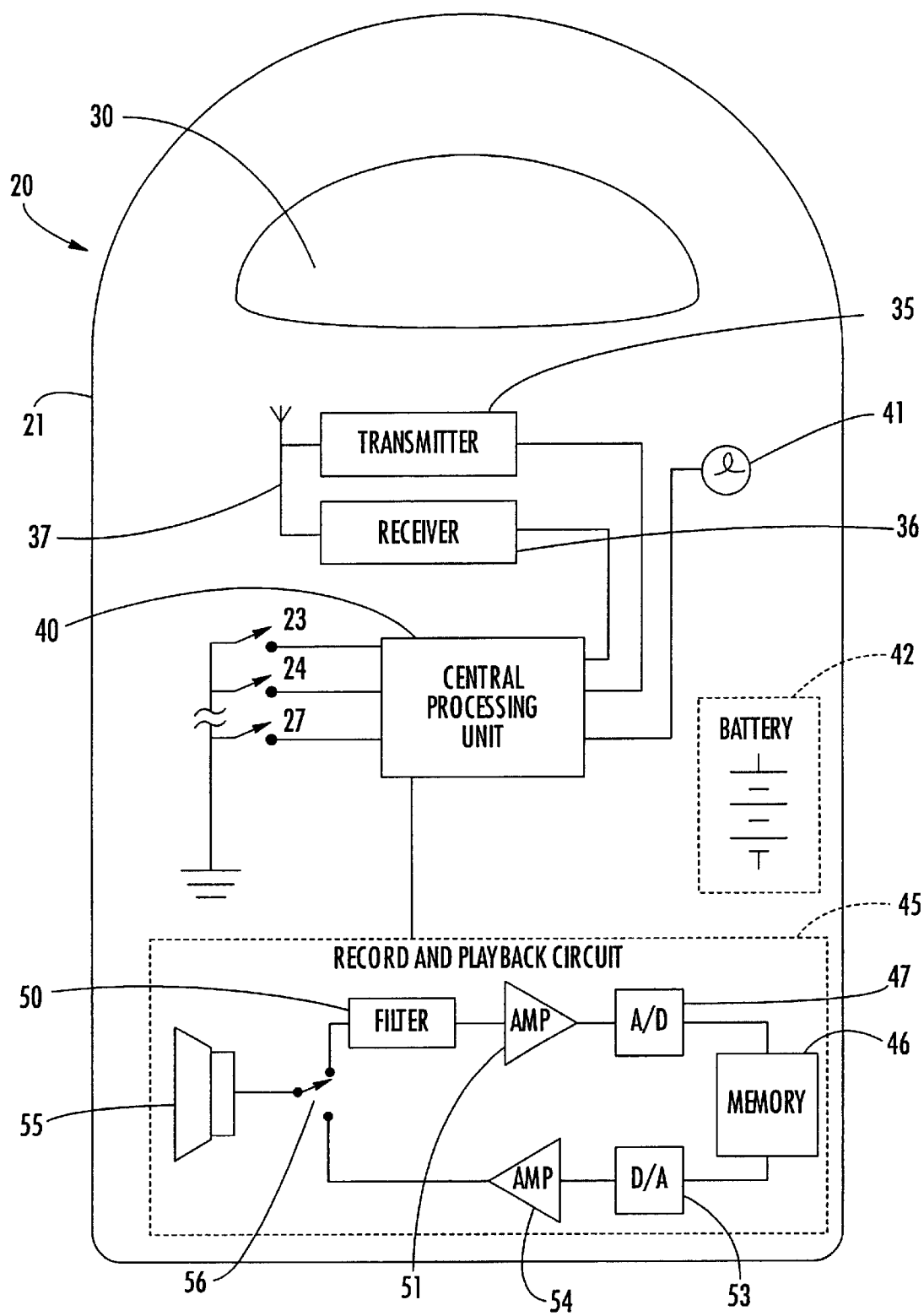
FIG. 2 is a more detailed schematic block diagram of the remote control and message recording device to be carried by the user as shown in FIG. 1.

Referring to FIGS. 1 and 2, the vehicle remote control and message recording system 10 in accordance with the present invention is now first described. The vehicle remote control and voice message recording system 10 comprises a vehicle remote function controller 12 and associated receiver 11 in the vehicle 15. A transmitter 13 may also optionally be provided in some embodiments where a remote alerting or paging feature is desired as will be readily appreciated by those skilled in the art. The receiver 11 and transmitter 13 are illustratively connected to the radio antenna 14.

The system 10 also includes the vehicle remote control and voice message recording device 20 to be carried by a user. The vehicle remote control and voice message recording device 20 includes a housing 21, and a plurality of momentary push button type switches 23–27 carried by the housing. In the illustrated embodiment, the housing 21 includes an upper portion defining an opening therein 30 for receiving a key ring 31 therethrough. The key ring 31, in turn, carries one or more keys 32 in a conventional fashion as will be appreciated by those skilled in the art.

The remote control and voice message recording device 20 also includes a transmitter 35 contained in the housing 21 for transmitting signals to the receiver 11 to operate the vehicle remote function controller 12 responsive to user activation of at least one of the switches. For example, switches 23–25 may be conventional arm, disarm, and trunk release switches for a vehicle security system as will be readily appreciated by those skilled in the art.

The remote control and voice message recording device 20 may also optionally include a receiver 36 in some embodiments to receive signals from the transmitter 13 in the vehicle 15. For example, such signals may be an alert or alarm indication that the vehicle is being broken into or is being moved. Other uses for the receiver 36 are also contemplated by the present invention.

The remote control and voice message recording device 20 also illustratively includes a processor or central processing unit (CPU) 40 for performing a number of the processing functions for the device. For example, the CPU 40 may read the switches 23–27 and control the transmitter 35. A battery 42 is also preferably provided within the housing 21 to supply electrical power for the device 20. An indicator, such as an LED or lamp 41 may be provided on the housing 21 to provide indications to the user that the transmission has occurred, for example.

The remote control and voice message recording device 20 also includes a record and playback circuit 45 in the housing 21. The record and playback circuit 45 is for recording and playing back a voice message from the user. For example, the user can use the record and playback circuit 45 to record the parking location of the vehicle. Since the user would carry the remote control device 20 with him, the device can be later used when returning to the parking facility to playback the recorded location to remind the user of the vehicle location. As shown in FIG. 1, the device 20 may be used to record and playback a message, such as "car parked on level three, row M, space five". Of course, the record and playback feature can be advantageously used for other messages and reminders as well as will be readily appreciated by those skilled in the art.

The record and playback circuit 45 may comprise a storage circuit, such as the illustrated semiconductor memory 46, for at least one voice message. As will be described in greater detail below, in one variation, the storage circuit or memory 46 may store a plurality of individual voice messages. Accordingly, the device may further comprise a selector, such as one or more of the switches on the housing 21, for selectively playing back a desired voice message from among the plurality of stored individual voice messages.

In another more simplified variation of the device 20, the record and playback circuit 45 includes a circuit cooperating with the storage circuit for recording a new voice message in place of a prior voice message. This circuit may be provided by the CPU 40, for example, which can provide the necessary enable and control signals to the record and playback circuit 45. In other words, only a single message is recorded and a new message is recorded over the prior message. Accordingly, this variation can be made relatively inexpensive and is easy to operate.

As mentioned briefly above, the storage circuit for the voice message may be provided by a semiconductor memory 46, such as, for example, an electrically erasable and programmable memory. Other types of storage circuits are contemplated as well; however, the digital implementation may be preferred because of the ease of integration with the other components and circuitry of the remote control and voice message recording device 20. The memory 46 could also be a portion of embedded memory included in the CPU 40 as will also be appreciated by those skilled in the art.

The record and playback circuit 45 also illustratively includes an analog-to-digital converter (ADC) 47 for converting the voice message signal into digital message data to be stored in the semiconductor memory 46 during recording. A filter 50 and amplifier 51 are illustratively connected upstream of the ADC 47. The filter 50 may be used to filter the input signal to reduce the memory capacity requirements as will be appreciated by those skilled in the art. For example, the filter may be set to pass only a typical voice frequency band of 300 to 3400 Hz, for example. The amplifier 51 may be used to achieve a desired level of the signal.

For playback, the record and playback circuit 45 also illustratively includes a digital-to-analog converter (DAC) 53 for converting the digital data from the semiconductor memory 45 back into an analog voice message signal. The amplifier 54 produces the playback signal at a desired audible level. Those of skill in the art will appreciate other circuit details and alternate configurations without requiring further discussion herein.

The record and playback circuit 45 also includes a transducer 55 carried by the housing 21 for performing at least one of a speaker and microphone function. In a typical configuration a single transducer is used for both functions. Alternately, two transducers could be provided, one for each function. In other words, the transducer 55 is used to detect the voice message signal when recording, and is used to generate the audible voice message during playback. Switching between these two functions for the transducer 55 is provided by the schematically illustrated switch 56 which may be controlled by the CPU 40, for example. Of course, other circuit variations and configurations are also contemplated by the present invention as will be understood by those skilled in the art.

Returning again briefly to the vehicle portion of FIG. 1, it is highlighted the system 10 may have multiple uses. The vehicle remote function controller 12 may be a vehicle remote keyless entry controller. Accordingly, at least one door lock motor 60 may be connected to the vehicle remote keyless entry controller as will be appreciated by those skilled in the art.

In another embodiment, the vehicle remote function controller 12 may be a vehicle security system controller, and at least one vehicle security sensor 61 may be connected to this controller. Of course, the vehicle security system controller would also typically be connected to an alarm indicator 62 at the vehicle, such as a siren or horn, for example.

In accordance with yet another application of the present invention, the vehicle remote function controller 12 may alternately be a vehicle remote start controller connected to a starter activating circuit 63.

Considered in somewhat different terms, the transmitter 35 may transmit at least one of an arm/disarm signal, a door lock/unlock signal, and an engine start signal. Those of skill in the art will appreciate other applications, and that several features may be combined into the system 10.

A method aspect in accordance with the invention is for operating a remote vehicle control and message recording device 20 to be carried by a user in combination with a receiver 11 and associated vehicle remote function controller 12 in the vehicle. The method preferably comprises the steps of: transmitting signals from the remote vehicle control and message recording device 20 to the receiver 11 to operate the vehicle remote function controller 12; recording at least one voice message from the user in the remote vehicle control and message recording device; and playing back the at least one recorded voice message from the remote vehicle control and message recording device.

More particularly, referring now to the flowchart of FIG. 3, one embodiment of recording a voice message is now described. This embodiment represents recording of only a single voice message with the previous message being erased. This embodiment is relatively simple in terms of operation, and reduces the memory capacity requirements as will be readily appreciated by those skilled in the art. From the start (Block 70), a record switch, such as switch 26, is monitored at Block 72. If the switch 26 is pressed for greater than a predetermined time, such as about 2 seconds, for example, as determined at Block 74, then the device indicates that the record mode has been entered (Block 76). This indication may be given by an audible beep, and/or a flashing of the lamp 41.

At Block 78 the previous recorded voice message is erased, and at Block 80 the new voice message is recorded. In one variation of the invention, the user holds the record switch 26 during recording of the message. At Block 82 it is determined whether the switch 26 is released or time has expired before stopping (Block 84). For example, the record and playback circuit 45 may be configured to provide only a predetermined time for recording the message, such as 30 seconds or 1 minute, for example. Of course other time periods can also be accommodated; however, the shorter the time period, the less costly the device 20 may be. The user can also stop the recording by releasing the switch 26.

Turning now to the flowchart of FIG. 4, an embodiment of a playback routine for the remote control and voice message recording device 20 including only the single voice message is now described. From the start (Block 90) a playback switch, such as switch 27 is monitored at Block 92. If the switch 27 is pressed for greater than a predetermined time as determined at Block 94, then the recorded message is played back (Block 96) before stopping at Block 98. Of course, other switch manipulations and approaches may also be used to play back the recorded voice message as will be appreciated by those skilled in the art.

Turning now to the flowchart of FIG. 5, another variation of the recording function is now described, wherein multiple individual voice messages may be recorded for selective later playback. From the start (Block 100), the record switch, such as switch 26 is monitored at Block 102. If the switch 26 is pressed for longer than a predetermined time as determined at Block 104, then channel switches are monitored at Block 106. An indication may also optionally be made that the record mode has been entered.

For example, the monitored channel switches could be the three switches 23–25 which are also used for transmitting control signals to the vehicle controller 12. However, once the record switch 26 is pressed for the predetermined time, the CPU 40 can assign the switches 23–25 to serve as the channel selection switches. Other switch configurations and schemes are also contemplated by the present invention.

At Block 108 it is determined which of the channel switches has been pressed. At Block 110 it may be indicated to the user which channel has been selected, such as, for example, giving three flashes of the lamp 41 or three beeps through the transducer 55 for channel three. At Block 112 the selected channel is erased and the new voice message recorded at Block 114. At Block 116 it is determined whether the time limit has been reached or the user has terminated the recording by lifting the selected channel switch before stopping (Block 118).

Turning now to the flowchart of FIG. 6, a technique for playing back a voice message from among a plurality of such messages is now described. From the start (Block 120), the playback switch, such as switch 27, is monitored at Block 122. If this switch 27 is pressed for more than a predetermined time (Block 124) then the channel switches 23–25 are monitored at Block 126. The user may also be given an indication that the playback mode has been entered.

At Block 128 it is determined which of the channels has been selected for playback. At Block 130 the selected voice message is played back to the user before stopping at Block 132. Those of skill in the art will appreciate other switching and timing schemes for selectively playing back one of number of recorded voice messages. Accordingly, many modifications and other embodiments of the invention will come to the mind of one skilled in the art having the benefit of the teachings presented in the foregoing descriptions and the associated drawings. It is understood that the invention is not to be limited to the illustrated embodiments disclosed, and that the modifications and embodiments are intended to be included within the spirit and scope of the appended claims.

That which is claimed is:

1. A vehicle remote control and voice message recording system comprising:
    a vehicle remote function controller and associated receiver in the vehicle; and
    a vehicle remote control and voice message recording device to be carried by a user and comprising
        a housing,
        a plurality of vehicle function switches carried by said housing,
        a transmitter in said housing and transmitting signals to said receiver to operate said vehicle remote function controller responsive to user activation of said plurality of vehicle function switches,
        a record and playback circuit in said housing for recording and playing back a voice message from the user, said record and playback circuit comprising a storage circuit having a plurality of channels for respective individual voice messages, and
        a selector cooperating with said record and playback circuit for permitting user selection of a desired channel of said storage circuit for recording a respective individual voice message therein based upon selective operation of a respective switch of said plurality of vehicle function switches, and for permitting user selection of the desired channel of said storage circuit for playing back the respective individual voice message therein based upon selective operation of the respective switch of said plurality of vehicle function switches.

2. A vehicle remote control and message recording system according to claim 1 wherein said record and playback circuit includes a circuit cooperating with said storage circuit for recording a new voice message in place of a prior voice message.

3. A vehicle remote control and message recording system according to claim 1 wherein said storage circuit comprises a semiconductor memory.

4. A vehicle remote control and message recording system according to claim 3 wherein said record and playback circuit further comprises an analog-to-digital converter for converting the voice message signal into digital message data stored in said semiconductor memory during recording.

5. A vehicle remote control and message recording system according to claim 4 wherein said record and playback circuit further comprises a digital-to-analog converter for converting the digital data from said semiconductor memory back into a voice message signal during playback.

6. A vehicle remote control and message recording system according to claim 3 wherein said semiconductor memory comprises an electrically erasable and programmable memory.

7. A vehicle remote control and message recording system according to claim 1 wherein said record and playback circuit comprises a transducer carried by said housing for performing at least one of a speaker and microphone function.

8. A vehicle remote control and message recording system according to claim 1 wherein said vehicle remote function controller is a vehicle security system controller; and further comprising at least one vehicle security sensor connected to said controller.

9. A vehicle remote control and message recording system according to claim 1 wherein said vehicle remote function controller is a vehicle remote keyless entry controller, and further comprising at least one door lock motor connected to said vehicle remote keyless entry controller.

10. A vehicle remote control and message recording system according to claim 1 wherein said vehicle remote function controller is a vehicle remote start controller, and further comprising a starter activating circuit connected to said vehicle remote start controller.

11. A vehicle remote control and message recording system according to claim 1 further comprising a transmitter connected to said vehicle controller; and wherein said vehicle remote control and voice message recording device further comprises a receiver for receiving signals from said transmitter in the vehicle.

12. A vehicle remote control and message recording system according to claim 1 wherein said vehicle remote control and voice message recording device further comprises a battery carried by said housing.

13. A vehicle remote control and message recording system according to claim 1 wherein said housing includes an opening formed therein to receive a key ring for a vehicle ignition key.

14. A vehicle remote control and voice message recording device for a vehicle remote control system comprising a vehicle remote function controller and associated receiver in the vehicle, the vehicle remote control and voice message recording device comprising:
    a housing to be carried by a user;
    a plurality of vehicle function switches carried by said housing;
    a transmitter in said housing for transmitting signals to the receiver to operate the vehicle remote function controller responsive to user activation of said plurality of vehicle function switches;
    a record and playback circuit in said housing for recording and playing back a voice message from the user, said record and playback circuit comprising a storage circuit having a plurality of channels for respective individual voice messages; and
    a selector cooperating with said record and playback circuit for permitting user selection of a desired channel of said storage circuit for recording a respective individual voice message therein based upon selective operation of a respective switch of said plurality of vehicle function switches, and for permitting user selection of the desired channel of said storage circuit for playing back the respective individual voice message therein based upon selective operation of the respective switch of said plurality of vehicle function switches.

15. A vehicle remote control and message recording device according to claim 14 wherein said record and playback circuit includes a circuit cooperating with said semiconductor memory for recording a new voice message in place of a prior voice message.

16. A vehicle remote control and message recording device according to claim 14 wherein said record and playback circuit further comprises an analog-to-digital-converter for converting the voice message signal into digital message data stored in said semiconductor memory during recording.

17. A vehicle remote control and message recording device according to claim 16 wherein said record and playback circuit further comprises a digital-to-analog converter for converting the digital data from said semiconductor memory back into a voice message signal during playback.

18. A vehicle remote control and message recording device according to claim 14 wherein said semiconductor memory comprises an electrically erasable and programmable memory.

19. A vehicle remote control and message recording device according to claim 14 wherein said record and playback circuit comprises a transducer carried by said housing for performing at least one of a speaker and microphone function.

20. A vehicle remote control and message recording device according to claim 14 wherein said transmitter transmits at least one of a security system arm/disarm signal, a door lock/unlock signal, and a remote engine start signal.

21. A vehicle remote control and message recording device according to claim 14 further comprising a receiver carried by said housing.

22. A vehicle remote control and message recording device according to claim 14 further comprising a battery carried by said housing.

23. A vehicle remote control and message recording device according to claim 14 wherein said housing includes an opening formed therein to receive a key ring for a vehicle ignition key.

24. A method for operating a remote vehicle control and voice message recording device to be carried by a user including a plurality of vehicle function switches and a storage circuit in combination with a vehicle remote function controller and associated receiver in the vehicle, the method comprising the steps of:
   transmitting signals from the remote vehicle control and voice message recording device to the receiver to operate the vehicle remote function controller;
   storing a plurality of voice messages in the storage circuit having a plurality of channels for respective individual voice messages; and
   selecting a desired channel for recording a respective individual voice message therein based upon selective operation of a respective switch of the plurality of vehicle function switches; and selecting the desired channel for playing back the respective individual voice message therein based upon selective operation of the respective switch of the plurality of vehicle switches.

25. A method according to claim 24 wherein the step of recording at least one voice message comprises the step of recording a new voice message in place of a previous recorded voice message.

26. A method according to claim 24 wherein the step of recording the at least one voice message comprises storing the at least one voice message in a semiconductor memory.

27. A method according to claim 24 wherein the remote control and voice message recording device comprises a transducer; and further comprising the step of using the transducer to perform at least one of a speaker and microphone function.

28. A method according to claim 24 wherein the step of transmitting comprises transmitting at least one of a security system arm/disarm signal, a door lock/unlock signal, and a remote engine start signal.

29. A vehicle remote control and voice message recording system according to claim 1 wherein said record and playback circuit is switchable between record and playback modes; and wherein said selector comprises:
   a record switch carried by said housing for entering the record mode for said record and playback circuit; and
   a playback switch for entering the playback mode for said record and playback circuit.

30. A vehicle remote control and voice message recording system according to claim 29 wherein said selector further comprises a processor carried by said housing and connected to said plurality of vehicle function switches, said record switch, and said playback switch.

31. A vehicle remote control and voice message recording device according to claim 14 wherein said selector comprises:
   a record switch carried by said housing for entering the record mode for said record and playback circuit; and
   a playback switch for entering the playback mode for said record and playback circuit.

32. A vehicle remote control and voice message recording device according to claim 31 wherein said selector further comprises a processor carried by said housing and connected to said plurality of vehicle function switches, said record switch, and said playback switch.

\* \* \* \* \*